United States Patent [19]

Gratzer

[11] Patent Number: 4,813,631
[45] Date of Patent: Mar. 21, 1989

[54] LAMINAR FLOW CONTROL AIRFOIL

[75] Inventor: Louis B. Gratzer, Seattle, Wash.

[73] Assignee: The Boeing Company, Seattle, Wash.

[21] Appl. No.: 794,470

[22] Filed: Nov. 2, 1985

Related U.S. Application Data

[63] Continuation-in-part of Ser. No. 416,923, Sep. 13, 1982, Pat. No. 4,575,030.

[51] Int. Cl.[4] .............................................. B64C 3/14
[52] U.S. Cl. .................................. 244/35 R; 244/209
[58] Field of Search ................................ 244/207–209, 244/210, 213, 214, 215, 123, 35 R

[56] References Cited

U.S. PATENT DOCUMENTS

| | | | |
|---|---|---|---|
| 2,945,644 | 7/1960 | Colman | 244/209 |
| 2,988,302 | 6/1961 | Smith | 244/209 |
| 3,617,018 | 11/1971 | Baetke | 244/214 |
| 3,941,334 | 3/1976 | Cole | 244/214 |
| 3,951,360 | 4/1976 | Anxionnaz | 244/209 |
| 4,121,787 | 10/1978 | Wilby | 244/35 R |
| 4,225,372 | 9/1980 | Kinzler et al. | 244/123 |
| 4,395,450 | 7/1983 | Whitener | 244/123 |
| 4,455,003 | 6/1984 | Hilbig | 244/35 R |
| 4,575,030 | 3/1986 | Gratzer | |

FOREIGN PATENT DOCUMENTS 2064709  2/1979  United Kingdom .

OTHER PUBLICATIONS

Aerospace America, vol. 22, No. 3, Mar. 1984, pp. 72–76, Wagner et al.
Journal of Aircraft, vol. 21, No. 8, Aug. 1984, pp. 612–617, Lange.

*Primary Examiner*—Galen Barefoot
*Attorney, Agent, or Firm*—Christensen, O'Connor, Johnson & Kindness

[57] ABSTRACT

A laminar flow control aircraft wing combines suction surfaces and slots in its leading and trailing edge regions, with natural laminar flow over its main box region, to achieve laminar boundary layer flow over a majority of the wing surface area. The wing includes a leading edge flap that is used to protect the leading edge region of the wing from insect accumulation and surface erosion caused by the impact of dirt, rain, or other airborne materials when the leading edge flap is deployed in a low-speed position. At high aircraft speeds, the leading edge flap is stored in the surface of the leading edge region of the wing and forms part of the suction system for that area of the wing. The wing also includes a flexible trailing edge suction surface spoiler system that allows the spoilers to bend either upwardly for lateral control or downwardly when the trailing edge flap is deployed into a low-speed position.

20 Claims, 12 Drawing Sheets

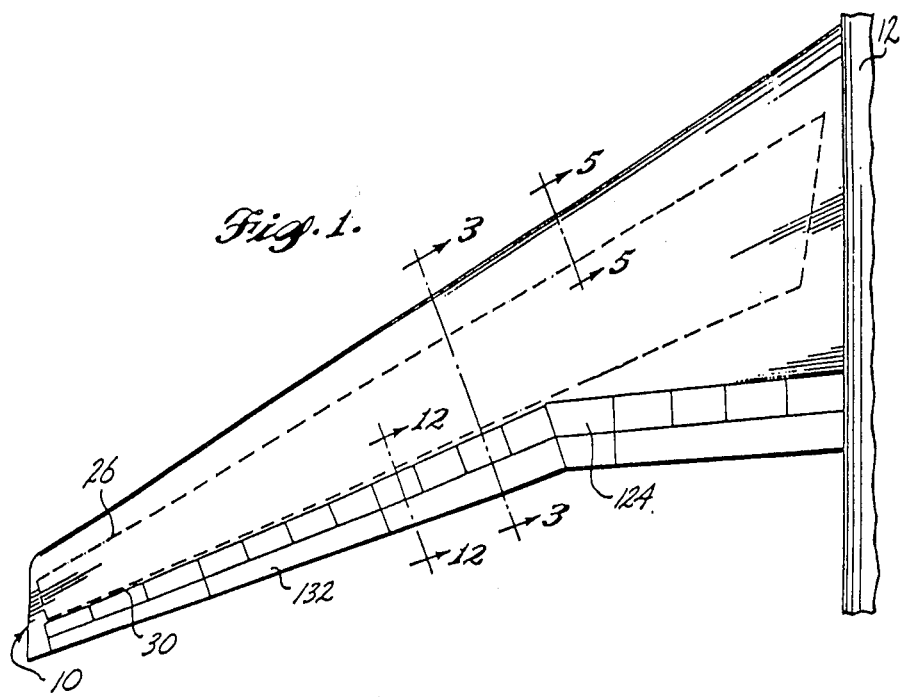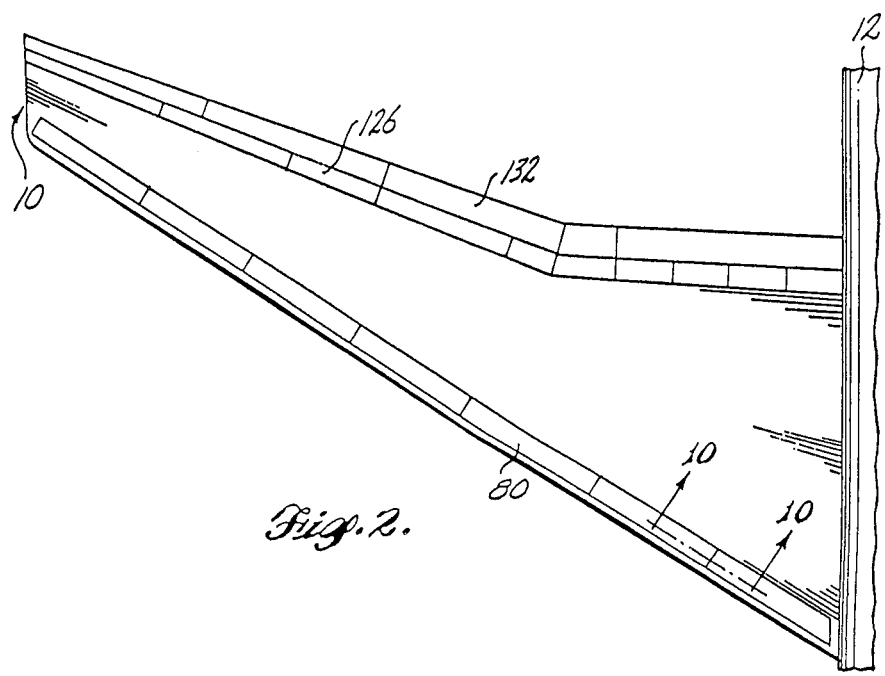

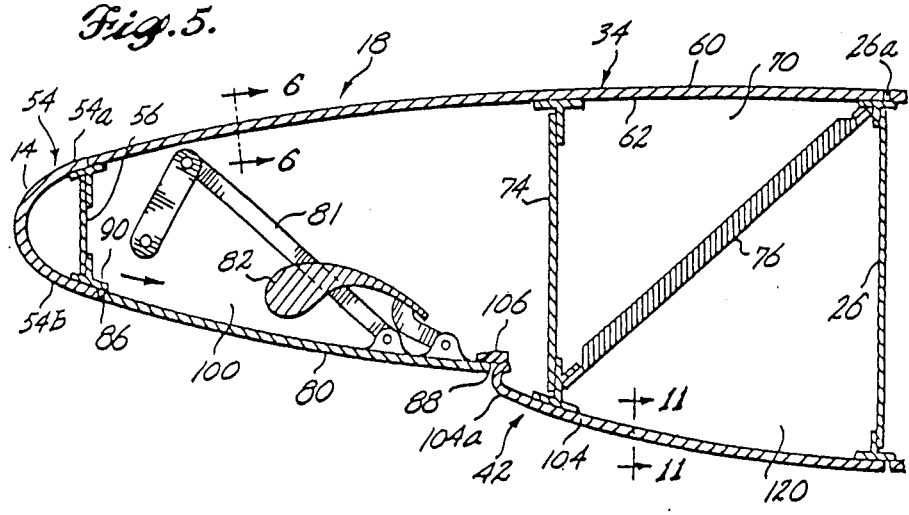
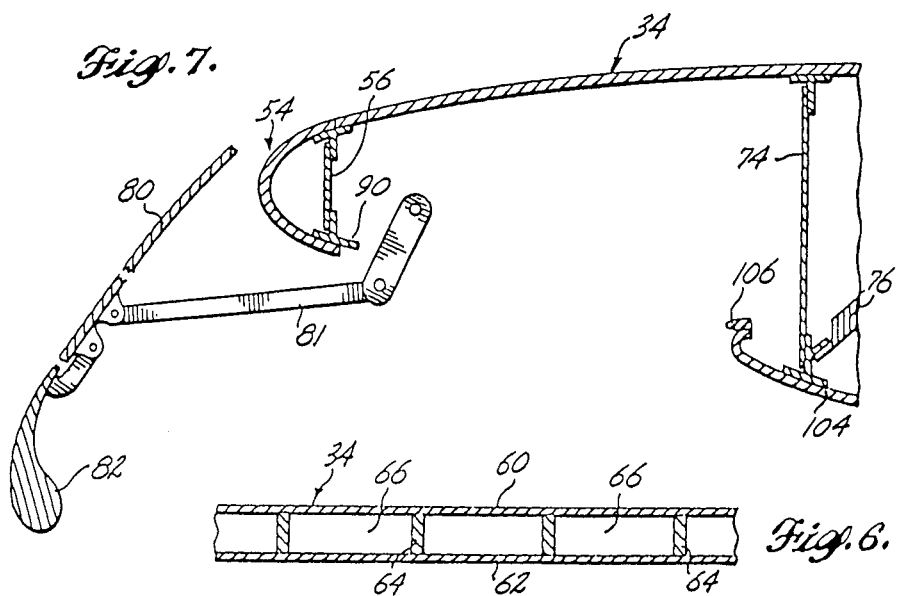
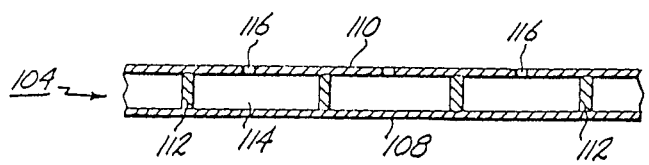

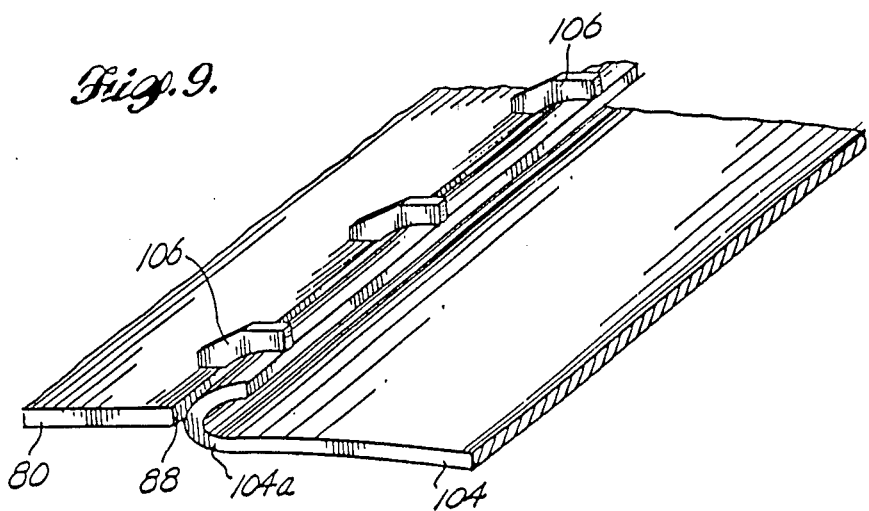
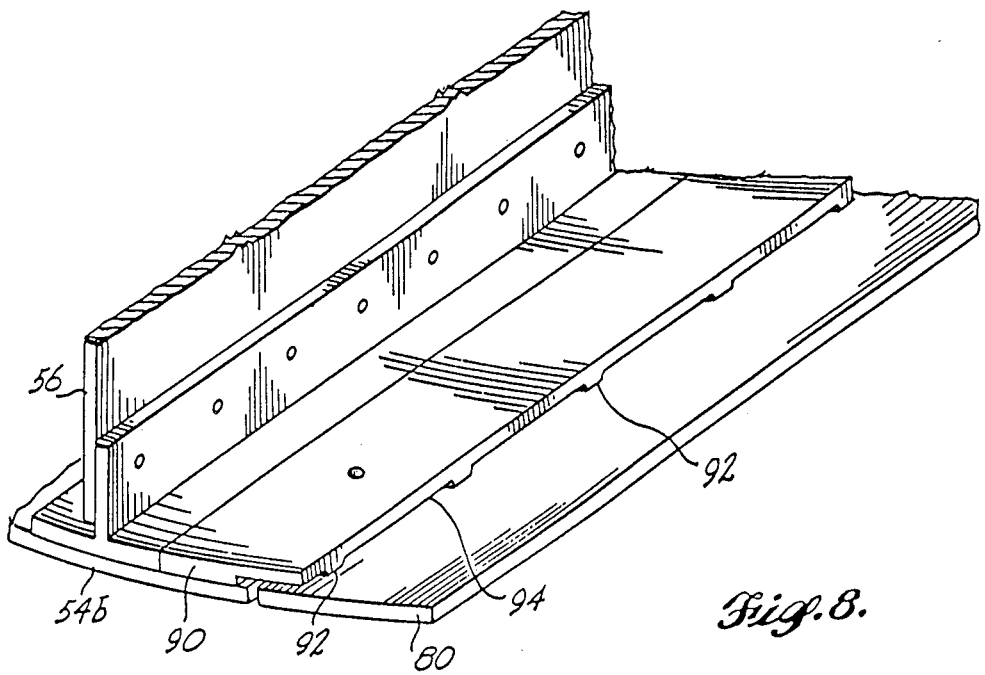

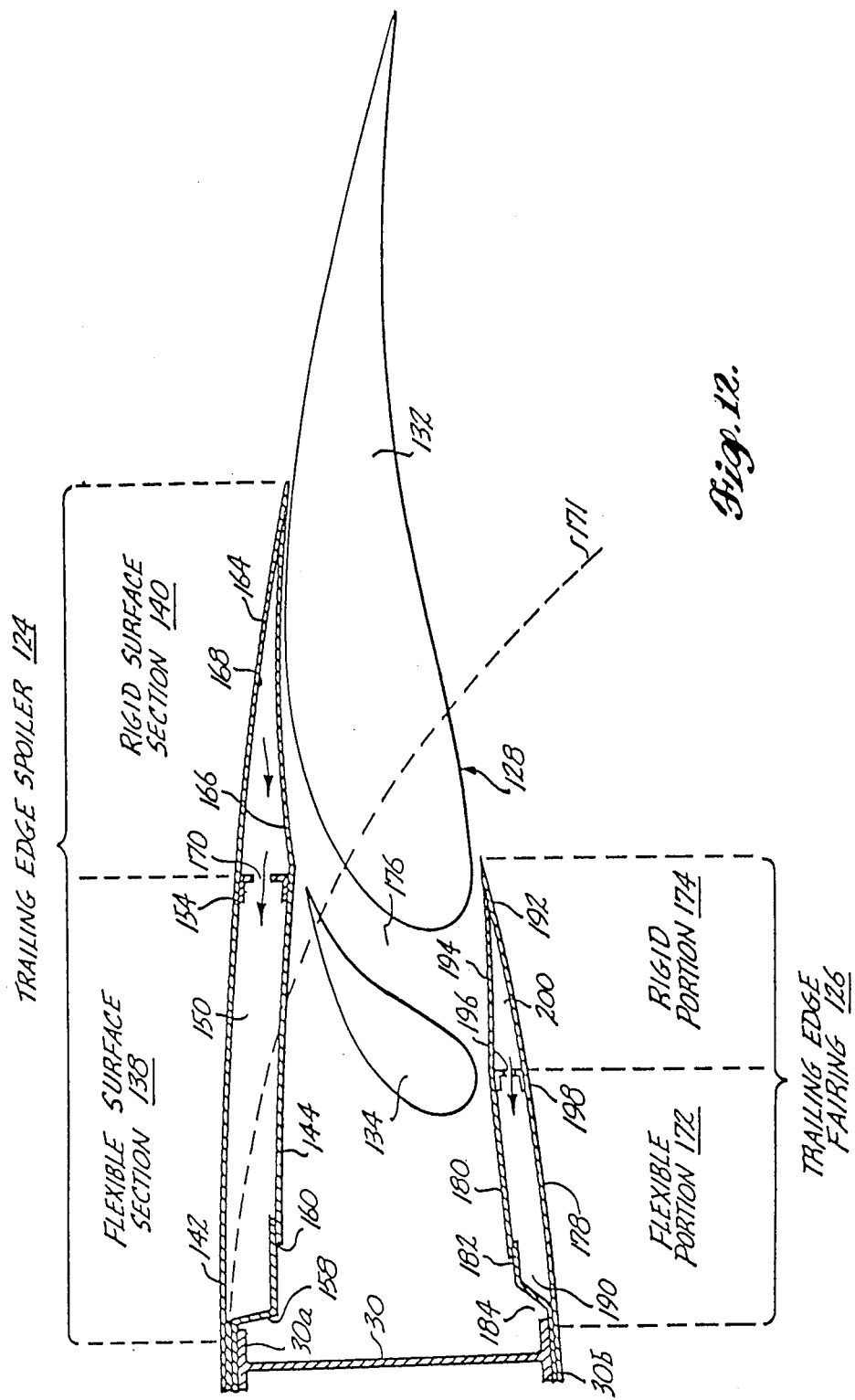

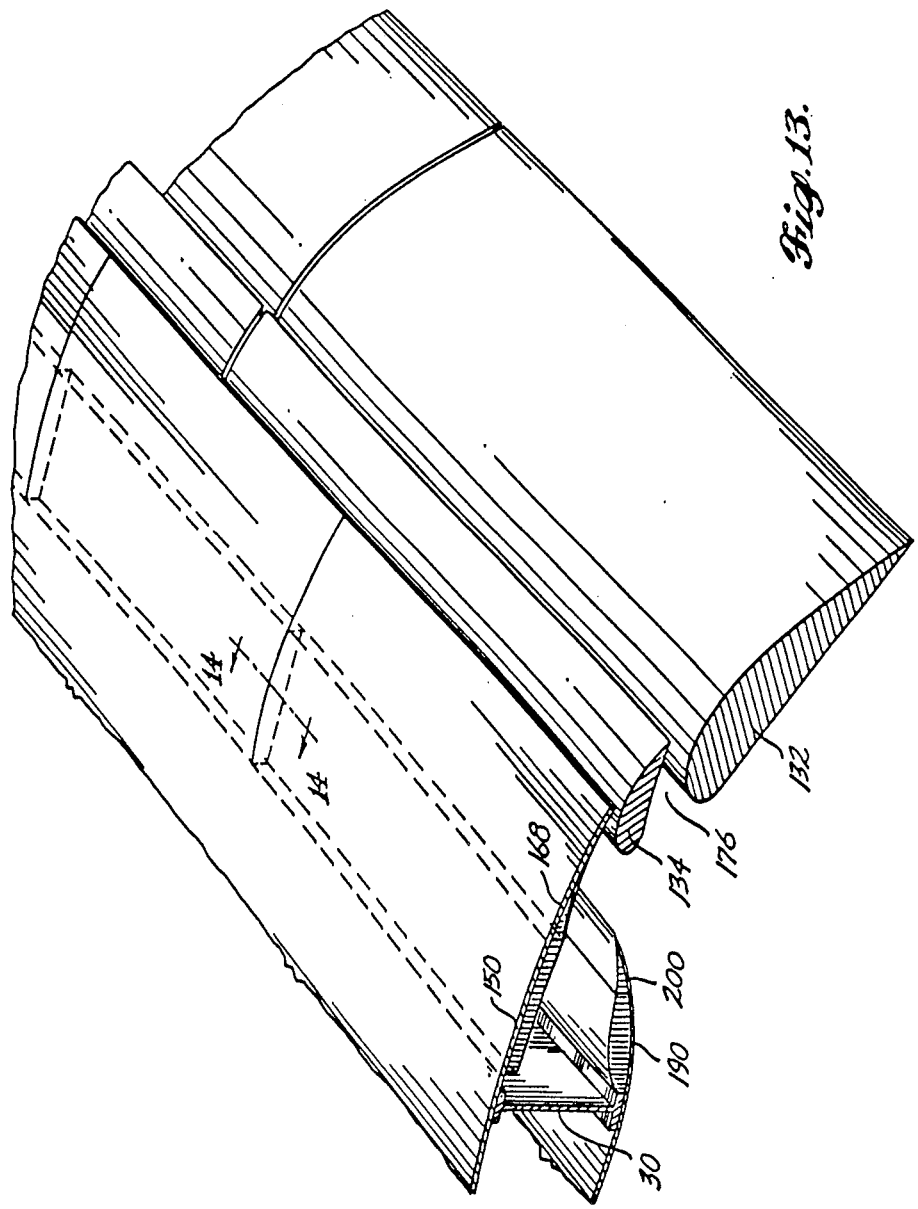

LAMINAR FLOW CONTROL AIRFOIL

This application is a continuation-in-part application based on prior copending application Ser. No. 416,923, filed on Sept. 13, 1982, now U.S. Pat. No. 4,575,030.

BACKGROUND

This invention relates to airfoils, and more particularly to a laminar flow control swept wing for use on jet transports.

There have been continuing efforts over the years to reduce the aerodynamic drag of aircraft and their components in order to increase cruise efficiency. It is known by those skilled in the art that if the boundary layer airflow over an airflow can be maintained laminar, skin friction drag is minimized.

Use of suction applied to aerodynamic surfaces to maintain laminar flow at high Reynolds numbers and during flight conditions beyond those where laminar flow can be expected to occur naturally, is also well known to those skilled in the art. There have been many proposals to accomplish this using various slot arrays, perforated or porous skin and associated suction ducting.

However, there are generally disadvantages associated with suction systems as previously proposed, such as undue added structural weight, complexity, and increased construction and maintenance costs. Additionally, since the use of suction on aerodynamic surfaces involves the addition of new systems, parts, substructures and structures that must be integrated with the principal airfoil systems and structures, the task of establishing functional reliability of new and unproven arrangements required by prior proposals has been a major concern and deterrent.

Also, variability of the operating environment of the aircraft can impose conditions which are generally inhospitable to the maintainence of laminar flow over aerodynamic surfaces. The distribution and magnitude of applied suction is based on certain assumptions as to operating environment, and when conditions vary widely as they do at times in flight due to air turbulence, noise, etc., those design assumptions no longer fit. The present invention, as one of its objectives, seeks to minimize drag penalty experienced when air conditions vary beyond assumed values.

Prior laminar flow control systems were predicated essentially on gross compromises of conventional wing construction and configuration so as to accommodate slots, pores, ducts, etc. The added cost, weight and complexities, along with the difficulties of access to inspect and maintain the added subsystems, tended to offset the gains sought through laminar flow control even under assumed (ideal) flight conditions.

An object of this invention is to provide a laminar flow control airfoil which minimized the aforementioned limitations and disadvantages of prior system proposals and which can be incorporated in conventional proven wing structures with minimum interface problems and with essentially no disruption or interference with the design integrity and established reliability of the existing airfoil main structure and its systems.

It is another object of this invention to provide an airfoil structural arrangement that has a built-in capability to maintain surface smoothness in the critical nose area against dents, erosion, and accumulation of insects and dirt particles. These factors cause disturbances which inhibit or destroy laminar flow but which can be controlled by the proper use of leading edge suction.

SUMMARY OF THE INVENTION

The foregoing and other objects are achieved in accordance with this invention by providing an airfoil that maintains laminar boundary layer flow over most of the airfoil surface by providing surface suction distributed over the minor airfoil surface area represented by the leading and trailing edge sections and by combining this with natural laminar flow achieved by contour alone over the intervening main box region section of the airfoil, representing the major surface area of the airfoil.

In accordance with this invention, an improved low-drag airfoil (typically the main wing) is provided based on a hybrid design concept utilizing laminar flow control (LFC) by suction of the boundary layer over minor areas of the airfoil and natural laminar flow (NLF) control over the major area of the airfoil. Applied as herein to a main wing, the wing box with surfaces making up the major area of the wing is conventionally structured with the intended advantages of proven structural integrity, light weight and minimum cost to serve as the basic wing load carrier, and also of proven leakproof wall integrity to serve safely as the primary fuel container, a container structure incidentally also designed for maximized volumetric fuel capacity. Natural laminar flow over top and bottom surfaces of this main wing section is achieved by way of surface contouring achieving favorable pressure gradients conducive to laminar flow over the normal climb and cruise speed range of the aircraft. The leading edge section is contoured to provide the pressure distribution, generally involving highly favorable pressure gradients at the nose, which will minimize the suction air requirement and also result in a leading edge radius that suppresses the tendency for transition to turbulent flow at the attachment line (i.e., the forwardmost edge of the airfoil). Complementary contouring of the remaining minor surface areas of the wing, including those of the trailing edge section, is based on factors which yield a structurally and aerodynamically efficient composite airfoil in other respects. Laminar flow control over those surface areas is achieved to the extent possible by the provision of a suction system, applying suction through skin pores over the smooth surface areas and through slot arrays next to joints and discontinuities requiring greater (localized) applications of suction.

In the preferred embodiment of the invention applied to a main wing, leading and trailing edge sections include parts employing a double skin panel construction. A porous or slotted outer skin separated from a nonporous inner skin by spacers forms a collector chamber. Boundary layer air drawn through the outer skin passes through vents or holes in the collector chamber into a subsurface duct which is part of an air collection system in the airfoil. When the leading edge flap is retracted, it forms part of the leading edge region lower surface. Suction slots formed in an array extending along the front and rear edges of the leading edge flap bleed off boundary layer air to compensate for the abrupt surface discontinuities represented by such edges, in order to maintain laminar flow.

The practical advantages realized through implementation of laminar flow control focused on the leading edge section, and preferably also the trailing edge section, include both contruction cost reductions and operating cost reductions. Inasmuch as the skin structure of the wing box need not be penetrated by holes or slots, the entire main wing box can be of proven conventional design, both externally and internally. Without the necessity of incorporating laminar flow control suction ducting within the main wing box, there is no significant interface required between the fuel tank regions within the box and the LFC suction system, risking fuel leakage into that system. Furthermore, LFC auxiliary structures that are added to the composite wing incur minimum weight penalty since they are confined to relatively small, noncritical areas of the wing. For similar reasons, manufacturing cost additions attributed to these auxiliary features are minimized, and the components which are correspondingly small in size can be manufactured separately and conveniently installed separately or as subassemblies. Likewise, inspection, maintenance, and repair are readily manageable because of the ease of access due to their location in the wing edge portions and due also to the extendability of the flaps and spoilers involved.

As an additional feature, the invention employs, in association with LFC direct provisions, a wholly retractable and extendable leading edge flap whose primary purpose is to extend the lift capability of the wing. However, it is also a deflector which, deployed during takeoffs and landings, protects the leading edge of the wing from impact by insects, dirt and other particles. The accumulation of these, including occasional erosion and denting, can significantly increase drag by causing loss of laminar flow in the affected areas and can also plug the LFC suction pores in the critical nose surface area of the wing.

The trailing edge portion of the wing includes a fully extendable and retractable flap whose primary function in normal climb and cruise flight is to provide lateral control. Small flap deflections are used to make adjustments in the wing pressure distribution that are necessary to maintain laminar flow throughout the normal flight envelope. Upper surface (i.e., spoiler) panels, each containing a flexible element and independently actuated, are programmed to follow the flap motion so as to maintain the optimum contour. For low-speed flight, large flap deflections further increase the wing lift capability. As before, the lateral control function is provided by the flaps through independent signals to the flap actuators and the upper surface panels follow the flap continuously to maintain optimum airfoil contours. The upper surface panels are also independently controlled to provide the usual spoiler function for flight and ground operations.

Lower surface panels disposed spanwise and each containing a flexible element serve as fairings to enhance the effectiveness of the flaps at large deflection angles. Both upper and lower surface panels contain suction surfaces and systems to provide laminar flow in the trailing edge areas within the normal flight envelope.

BRIEF DESCRIPTION OF THE DRAWINGS

Other objects and advantages of the present invention will become apparent to one skilled in the art after a reading of the following description taken together with the accompanying drawings, in which:

FIG. 1 is a plan view of the upper surface of a wing attached to the fuselage of an aircraft;

FIG. 2 is a plan view of the lower surface of an aircraft wing;

FIG. 5 shows an enlarged cross-sectional view of the leading edge region of the wing taken along section line 5—5 of FIG. 1;

FIG. 6 is an enlarged cross-sectional view of the leading edge region upper surface taken along section line 6—6 of FIG. 5;

FIG. 7 is an enlarged partial cross-sectional view of the leading edge region of the wing with the leading edge flap in the low-speed position.

FIG. 8 is an enlarged perspective view of the inner surface of the leading edge region of the wing wherein the front edge of the leading edge flap comes up against a front stop plate;

FIG. 9 is an enlarged perspective view of the inner surface of the leading edge region of the wing wherein the rear edge of the leading edge flap comes up against the flap stops;

FIG. 11 is an enlarged cross-sectional view of the leading edge region lower surface taken along section line 11—11 of FIG. 5;

FIG. 12 is an enlarged cross-sectional view of the trailing edge region of the wing taken along section line 12—12 of FIG. 1;

FIG. 13 is a perspective view of the trailing edge region of the wing with the trailing edge flap in a low-speed position;

DETAILED DESCRIPTION

Figure 3:
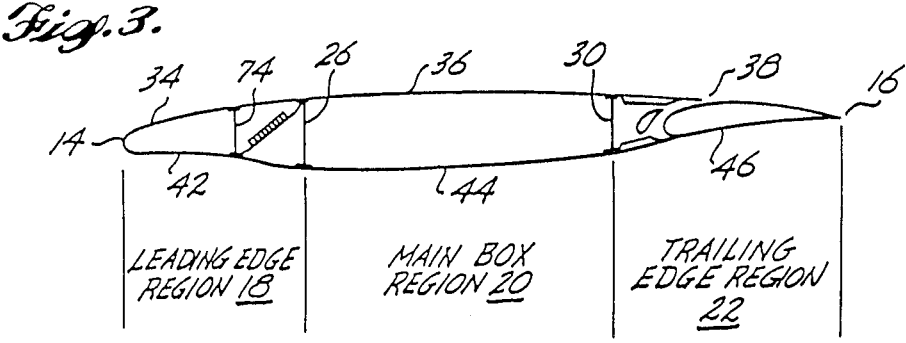
FIG. 3 is a cross-sectional view of an aircraft wing taken along section 3—3 of FIG. 1.

In FIGS. 1 and 2, wing 10, attached to a fuselage 12, is divided into three sections or regions: (1) leading edge region 18, (2) main box region 20, and (3) trailing edge region 22 as shown in FIG. 3. Region 18 extends chordwise between the leading edge or nose 14 and a front main box spar 26 forming part of the main box region 20. The trailing edge region 22 extends aft from rear main box spar 30 to the trailing edge 16. In accordance with the present novel hybrid wing concept, flow over leading edge region 18 and trailing edge region 22 is kept laminar with the aid of suction applied through their surfaces while flow over the surfaces of the main box region 20 is kept laminar naturally by designing the surface contours of those surfaces to promote the required favorable pressure gradients.

Figure 4:
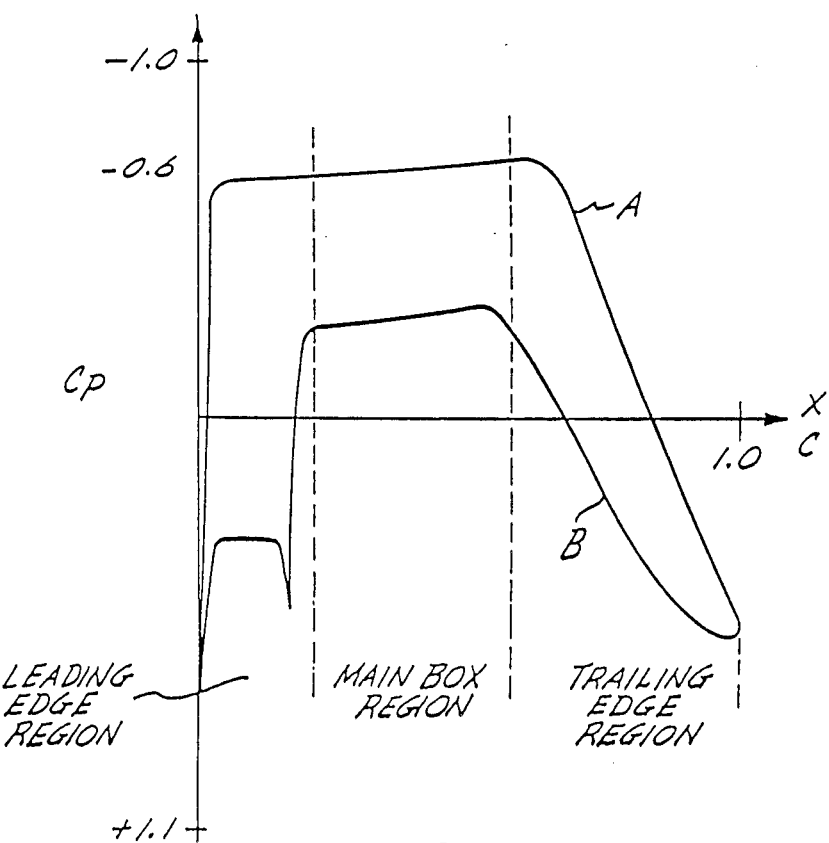
FIG. 4 is a graph illustrating the relationship of the coefficient of pressure ($C_p$) with location on the wing surface.

In FIG. 4, showing the characteristics of the preferred pressure distribution, coefficient of pressure ($C_p$) of the hybrid wing is plotted at cruise speed as a function of displacement from the nose or leading edge 14. $C_p$ is defined by the following equation:

$$C_p = \frac{p - p_{oo}}{q},$$

where p equals the local pressure at a given point x; $p_{oo}$ equals atmospheric pressure; and q equals $\rho$ times $V^2/2$, where $\rho$ equals air density, and V equals free stream velocity. Curve A in FIG. 4 shows the variation of $C_p$ over the wing's upper surface and curve B represents the variations of $C_p$ over the wing's lower surface.

At cruise (e.g., mach number 0.8), the $C_p$ at the stagnation point on the leading edge 14 is approximately +1.1. From there the upper surface $C_p$ rapidly becomes negative as the air accelerates over the leading edge region upper surface 34. By proper contouring of the main box upper surface 36, the $C_p$ is held by upper surface contour to maintain the necessary favorable pressure gradient for laminar airflow over that upper surface. As such airflow leaves the main box region 20 and flows over the trailing edge region upper surface 38 to the trailing edge 16, the $C_p$ increases from a negative to a positive value until the airflow separates from the trailing edge 16 of the wing.

With respect to the lower wing surface, the $C_p$ increases initially from leading edge 14, but remains positive over the leading edge region lower surface 42 because of the relatively flat contour of that surface. $C_p$ then becomes negative as the air flows from the leading edge region lower surface 42 to the main box region lower surface 44. Here also, a favorable pressure gradient in the direction of airflow over the main box region lower surface 44 is maintained naturally because of the contour of the surface. In the transition area from the main box region lower surface 44 to the trailing edge region lower surface 46, the $C_p$ for the lower surface starts to increase until the trailing edge 16 is reached, at which point the air flowing over the lower surface joins the air flowing over the wing's upper surface as it separates from the wing 10.

In FIG. 5 nosepiece 54 is configured in an approximate parabolic profile extending into an upper edge portion 54a and a lower edge portion 54b. Extending the length of wing 10, nosepiece 54 is preferably of integral titanium honeycomb core construction. Its rearward edges are joined to upright nose spar 56, also extending the spanwise length of the nosepiece.

Also joined to nose spar 56 and extending aft as a continuation of nosepiece upper surface 54a is a dual skin panel 34 including porous (multiply apertured) outer skin 60 and a nonporous inner skin 62 maintained parallel to skin 60 by chordwise-oriented parallel spacers 64 (FIG. 6). The spaces 66 thus formed within panel 34 form suction air collection chambers and flow passages that conduct air drawn through the distributed pores or apertures in skin 60 rearward toward upper surface duct 70. Duct 70 is formed forwardly of and above the diagonally oriented partition 76 extending between the lower edge of an upright auxiliary spar 74, spaced forwardly from the front spar 26, and upper panel 34. In the space between auxiliary spar 74 and front spar 26, the inner skin 62 contains multiple holes (not shown) which are sized to meter the suction airflow into supper surface duct 70.

Still referring to FIG. 5, the leading edge region lower surface skin panel assembly 42 includes spanwise extending lines of suction slots 86 and 88 formed at the forward and rear edges of leading edge flap 80. Aft of slot line 88 this lower surface assembly 42 comprises a short bullnose section 104a contiguous with a hollow skin panel 104 having a porous or multiply apertured outer skin and an inner skin. Leading flap 80 is mounted to be deployed and retracted by a suitable (whose details are or may be conventional) mechanism 81, typical of leading edge flap systems. When extended from retracted cruise setting (FIG. 5) into the deployed setting (FIG. 7), leading edge flap 80 increases lift for low speed operation in the usual way. Moreover, as a unique additional feature, the fully deployed leading edge flap 80 is positioned forwardly of nose 54 and oriented at a rearward incline. It thereby serves as a deflector that protects the leading edge wing surfaces from the accumulations of insects and dirt, and, to a substantial degree, from surface erosion due to dirt, rain, or hail. Such accumulations and erosion create surface discontinuities that interfere with the maintenance of laminar flow over the leading edge region of the wing 10. As shown in FIGS. 5 and 7, the leading edge flap comprises a main panel which forms part of the leading edge region lower surface and an auxiliary flap 82 hinged to it that is normally folded over to be received within the leading edge region interior with the leading edge flap retracted. When the leading edge flap 80 is deployed, auxiliary flap 82 is pivoted downwardly and forwardly and forms an aerodynamic leading edge to complete the contour of the resultant high-lift wing leading edge section.

Surface jogs or discontinuities created in the lower surface of the leading and trailing sections of leading edge flap 80 in the stored cruise position are initiating factors creating turbulence and flow separation. Suction applied adjacent these discontinuities through the previously mentioned slots 86 and 88 are effective to maintain laminar flow at these locations. The suction applied through these slots also minimizes crossflow instability along the leading edge or nose of the wing. It also minimizes the turbulence-inducing effect of any accumulations of insects and dirt, and of surface erosion that may have occurred.

Figure 15:
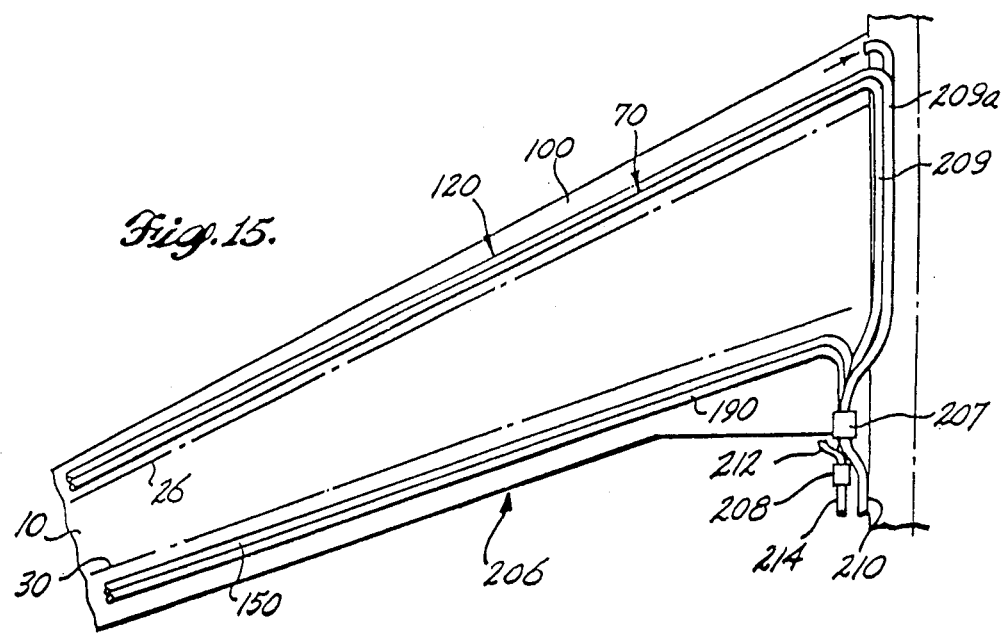
FIG. 15 is a cutaway plan view of an air collection system for an aircraft wing.

Slot 86 is formed by the gap or space in between the rear edge of the nosepiece lower portion 54b and the front edge of the leading edge flap 80. A substantially planar front stop plate 90 is mounted adjacent the rear edge of the nosepiece lower portion 54b and serves as a stop for the front edge of the leading edge flap 80 when the flap is retracted into cruise position. A series of downwardly oriented projections 92, spaced apart spanwise of the wing, extend from the lower surface of this front stop plate and serve as the actual stop abutments. As shown best in FIG. 8, projections 92, the lower surface of stop plate 90 and the inner surface of the leading edge flap 80 form entry passages 94 for suction airflow passing from the leading edge front slot 86 into purge duct 100. This duct is formed by the nose spar 56, skin panel 62, auxiliary spar 74, and the leading edge flap 80. Slot 88 also opens directly into purge duct 100. At cruise speeds, purge duct 100 under suction created by compressor 207 (FIG. 15), is maintained at a pressure lower than that outside the slots 86 and 88.

The forward edge 104a (FIG. 9) of the leading edge section outer skin 104 is turned inwardly and rearwardly to its terminus, so as to form a forwardly facing convex surface as one side of an orifice comprising the rear slot 88. Mounted on the upper side of the forward edge 104a are a series of forwardly extending flap stops 106 carried in positions spaced apart spanwise of the wing by the trailing edge of the leading edge flap 80. The leading edge flap 80 abuts upwardly against these flap stops when the flap is stowed in its cruise position. The flap actuator mechanism aided by differential air pressure acting upon the flap 80 cooperates to hold the flap firmly in its cruise position once it is retracted by such mechanism.

As previously mentioned, and as shown in FIGS. 3 and 5, leading edge flap 80 when stowed is essentially horizontal. Moreover, its exposed surface contour is fairly flat. Hence, the values of $C_p$ over most of its chordal length remain uniformly positive and thereby favorable to laminar flow. At its edges suction slots 86 and 88 are effective to eliminate flow disturbances and maintain laminar flow.

Figure 10:
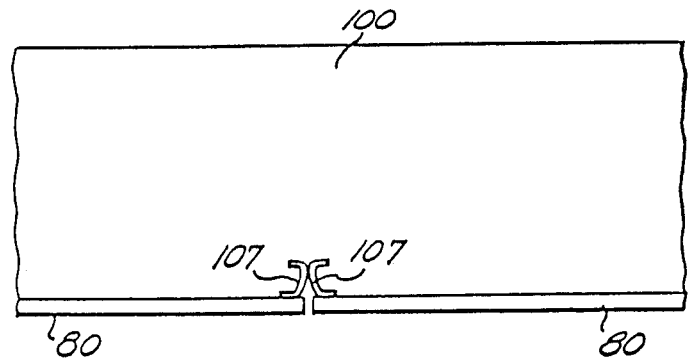
FIG. 10 is an enlarged cross-sectional view of a joint between two leading edge flap surface taken along section line 10—10 of FIG. 2.

Each wing carries a series of similar leading edge flaps 80 mounted end to end as shown. Channel-shaped flexible metal seals 107 (FIG. 10) are fastened to the end edges of the flaps and cooperate to seal the joints between such ends sufficiently to prevent all but minor amounts of suction air to pass between them into purge duct 100.

Referring to FIGS. 5 and 11, the remaining panel 104 of the leading edge region lower surface 42 is formed by a porous outer skin 108 and a vented inner skin 110 maintained in spaced parallel relationship by intervening spacers 12. Suction air drawn through the pores or apertures in the outer skin 108 into the passage spaces 114 between these skins flows through vents 116 in the inner skin 110 and from there into the lower surface duct 120. These multiple holes or vents are approximately placed and sized to meter the suction airflow through the outer skin 108. The lower surface duct 120 is formed by the front spar 26, the partition 76 and the leading edge lower skin 104.

The main box region 20 is contoured to provide a pressure distribution as shown in FIG. 4 to induce laminar flow naturally, that is, without resort to surface pores or slots distributed over its surface area. It thereby avoids the complications and added weight attending use of subsurface structures and ducting going along with a porous or slotted suction surface approach to achieving laminar flow, especially when applied over the major wing section's surface area and to some extent, at least, unavoidably intruding upon what is preferably a proven conventional structural and fuel storage wing section. In order to achieve natural laminar flow over its chordal extent at top and bottom surfaces, the contours of these surfaces are only moderately convex. As shown in simplified general form in FIG. 3, the main box region top skin panel 36 spans between the top edges 26a and 30a of front and rear main box spars 26 and 30, while the main box region lower surface 44 similarly spans between the respective lower edges 26b and 30b of these spars. Details of the wing box structure omitted from the drawings may be conventional, but are not required to be so.

Referring to FIG. 12, the wing's trailing edge region 22 extending aft from main box region 20 comprises an upper surface spoiler 124, a lower surface trailing edge fairing 126, and an extendable trailing edge main flap 128. Suction surface panels are used selectively in the trailing edge region 22 in order to help maintain laminar airflow proceeding aft from the main box surfaces. Trailing edge flap composite 128, preferably conventional, includes a primary flap member 132 and a secondary flap member 134 mounted forwardly of member 132, in fixed relationship thereto, defining a slot 176 between them. Since the linkage and drive means for mounting and moving the flap composite 128 between deployed and stowed positions are or may be conventional, the drawings herein are simplified by omitting these details.

Trailing edge spoiler 124 comprises a forward flexible surface section 138 and a rigid section 140 continuing aft from it and having about the same chordal extent. The flexible section 138 is joined by its forward edge to the top edge 30a of the rear spar 30. Joined to section 138, rigid section 140 terminates aft thereof at a point approximately at the mid-chord position of the flap, where it closely overlies and fairs into the top side of flap 132 with the latter stowed in the cruise position. The lower surface contour of section 140 is relieved concavely so as to accommodate the convexed top side contour of flap 132 immediately underlying it with the flap stowed.

In the present embodiment, the flexible surface section 138 is configured of a porous, flexible outer skin 142, which serves as a suction surface, and a nonporous, substantially inflexible inner skin 144 that is approximately parallel to and spaced inwardly from the outer skin 142. The space between the outer and inner skins forms a spoiler suction air collection duct 150. The outer skin 142 is affixed by its forward edge to top edge 30a of the rear box spar 30 and extends rearwardly to a point adjacent an upper surface crossmember 154. The forward edge of the inner skin 144 is mounted to lie on the lower side of a horizontal flange of a hanger bracket 158 by means of a sliding joint 160. The hanger bracket 158 is attached to the top edge 30a of the rear spar and extends downwardly and rearwardly to a point adjacent the forward edge of the inner skin. The sliding joint 160 allows the inner skin to move relative to bracket 158 as the spoiler 124 pivots with respect to the wing 10. Leakage of air past the sliding joint is minimized by the placement of the inner skin 144 below the flange of bracket 158. Since the air pressure inside of spoiler duct 150 is lower than the pressure outside, inner skin 144 is forced upwardly against the bracket 158.

The rigid section 140 of the trailing edge spoiler 124 consists of a porous upper skin 164 and a nonporous lower skin 166. The forward edge of the upper skin 164 is spaced away from the forward edge of the lower skin 166 by the upper surface crossmember 154, and the rear edges of the upper and lower skins converge with one another at the rear edge of the spoiler 124. The space between the upper and lower skins 164 and 166 forms a rear spoiler suction air collection chamber 168. The upper surface crossmember 154 has vent holes 170 that allow air to be drawn through the upper skin 164 into the rear spoiler chamber 168 and into the flexible spoiler duct 150.

As shown in FIGS. 12 and 13, flexible spoiler section 138 is designed to bend downwardly in a curve 171 so as to maintain a smooth fairing with the flap 128 with the latter in its deployed position. If desired, duct suction can also be applied to the porous upper surfaces of the spoiler during low-speed flight as well as during cruise flight in order to minimize flow separation and thereby increase low-speed capability. This is also true of other porous and slotted upper surfaces of the wing disclosed herein. The linkages and actuators for moving the spoiler assembly are or may be of simple and straightforward design using standardized components and therefore require no detailing herein.

With continued reference to FIGS. 12 and 13, the trailing edge fairing 126 comprises a forward bendably flexible portion 172 and a rear portion 174 of rigid form. The flexible portion includes a porous flexible outer skin panel 178 and a nonporous inner plate 180. The forward edge of the outer skin 178 is affixed to the bottom edge 30b of the rear spar 30 and abuts the rear edge of the main box lower skin panel 44. Spaced inwardly from and oriented substantially parallel to the outer skin panel 178 is the inner plate 180. The forward edge of the inner plate is supported through a sliding joint 182 to a support member 184. The member 184 is an inverted version of hanger bracket 158, with the forward portion of member 184 affixed to the bottom edge 30b of rear spar 30. Sliding joint 182 is essentially identical to sliding joing 160 and allows plate 180 to move relative to support member 184 when fairing 126 bends with respect to wing 10. The rear edges of outer skin panel 178 and plate 180 are separated by a lower surface crossmember 188. The space between the outer skin panel 178 and the inner plate 180 forms a flexible fairing duct 190.

Contiguous with the rear end of flexible portion 172 is the rigid portion 174 of fairing 126. The rigid portion 174 consists of a porous, rigid outer skin panel 192 and a nonporous, rigid inner panel 194. The forward edges of members 192 and 194 are spaced apart by the lower surface crossmember 188 that has apertures 196 that allow air to flow from a rear fairing chamber 200 formed within the rigid portion 174 to the flexible fairing duct 190 formed within the flexible portion 172. The rearmost edges of members 192 and 194 converging together form the trailing edge of fairing 126.

The flexible fairing duct 190 draws boundary layer air through pores in the lower outer skin panel 178 of the flexible portion 172 and through those in outer skin 192 of rigid portion 174, thereby promoting laminar flow over the trailing edge fairing 126.

For low-speed operation with trailing edge flaps extended, the fairing surface 126 is caused to move in concert with the flap through a suitable linkage (not shown) which places it in a faired position as illustrated in FIG. 13. In the low-speed faired position, air flowing over fairing 126 is directed toward slot 176 in trailing edge flap 128.

Figure 14:
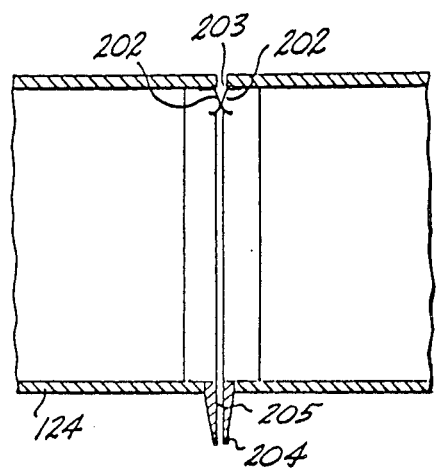
FIG. 14 is a cross-sectional view of the joint between two adjacent spoiler sections taken along section line 14—14 of FIG. 13.

As with the leading edge flaps, the spoilers 124 and fairings 126 are divided into sections extending end to end along the span of the wing. Flexible spoiler duct 150 and flexible fairing duct 190, formed sectionally within the spoiler and fairing sections, respectively, require joint seals between their adjacent section ends. FIG. 14 illustrates a representative form of seal between the ends of two spoiler sections. In this seal, two flanged flexibly resilient metal or plastic strips 202 bear against each other across the upper joint gap 203 so as to sufficiently eliminate most of the airflow occurring through the gap, a perfect seal not being required. A flapper type seal 204 is used along the lower joint gap 205 to seal the gap. Seal 204 is flexible so that when air is drawn through spoiler duct 150, seals 204 press against one another not permitting any air to pass through gap 205.

In the illustrated suction air collection system 206 (FIG. 15) an air compressor 207 driven by a small gas turbine or electric motor 208 pulls air through all of the leading edge region ducts 70, 120, 100, by way of suction manifolds 209 and 209a. Manifold 209 collects airflow from the spanwise upper surface duct 70 delivering it to the high-pressure ratio section of the compressor. Manifold 209a collects airflow from the spanwise lower surface duct 120 and purge duct 100 and delivers it to the low-pressure ratio section of the compressor. The trailing edge region ducts 150 and 190 feed airflow into the high-pressure ratio and low-pressure sections of the compressor respectively. Adjustable control valves near the compressor (not shown) permit flow matching to compressor operating conditions and also allow changes in airflow distribution into the compressor as required by flight conditions and the corresponding suction requirements for each section of the wing. All suction air entering the compressor is discharged into the free stream through exhaust duct 210. If a gas turbine (208) is used to drive the compressor, combustion air for the turbine enters through inlet 212 and the resultant exhaust gases from the turbine exit by way of exhaust duct 214.

Figure 16:
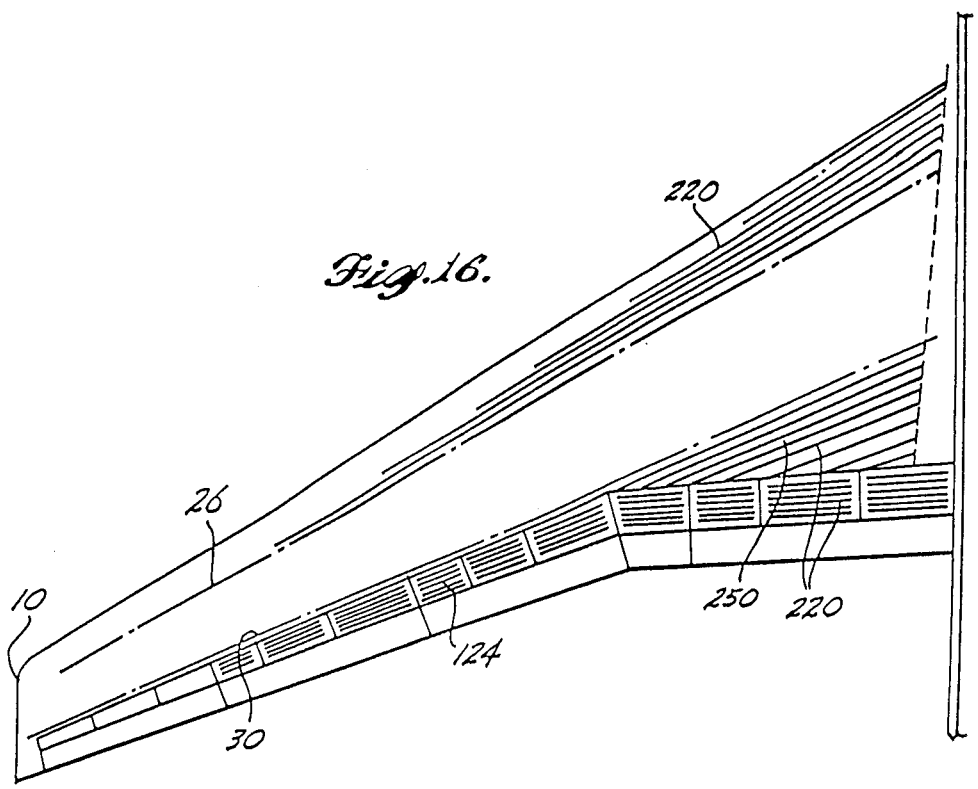
FIG. 16 is a plan view of the upper surface of an aircraft wing incorporating slotted suction surfaces.

In the embodiment of FIG. 16, suction is distributed over the skin surfaces of the leading edge region 18 and trailing edge region 22 by lines of slots 220 rather than by way of porous or multiply apertured skin panels as in the previous embodiments wherein, in addition to slots placed at locations of discontinuities, the major surface panels of these sections are porous or multiply apertured.

Figure 18:
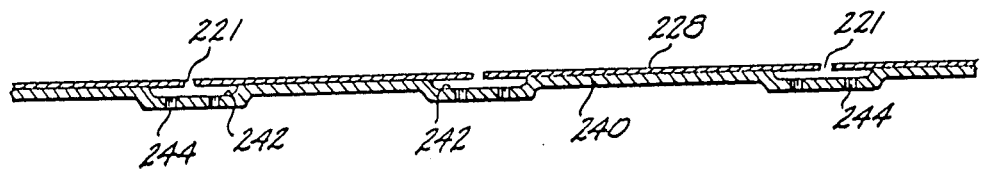
FIG. 18 is a sectional view of a trailing edge suction surface incorporating slots.
Figure 17:
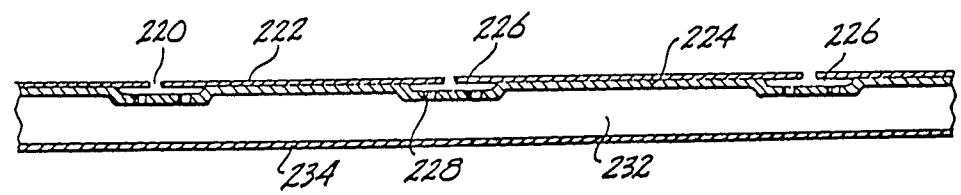
FIG. 17 is a sectional view of a leading edge region suction surface incorporating slots.

The approximately parallel lines of slots 220 extend spanwise of the wing starting adjacent the fuselage and in a nearly parallel relationship. For certain airplane designs and operating conditions, it is desirable to limit the spanwise extent of the suction areas to avoid structural complexity and excess suction airflow. Thus, in FIG. 16 the slots are graduated in length, the shortest being located adjacent the leading edge and the longest spaced aft thereof being located adjacent the front main box spar 26 (see also FIG. 5). For rigid panels, a suitable way to form and apply suction to the array of slots 220 is shown in FIG. 17. The slotted outer skin panel 222 is mounted on and fastened to an underlying support panel 224 with corrugations forming flow distribution channels 226 which are in register with the respective slots. Air bleed holes 228 in the bases of these channels allow suction air from the channels to enter duct passages 232 formed between the outer skin panel 222 and the inner skin panel 234. For flexible panels, a modified LFC slot system may be applied in a similar manner to the trailing edge section surfaces. FIG. 18 depicts this. It includes slots 221 in the outer surface panel 228, a support panel 240 with corrugations providing flow channels 242 with bleed holes 244, and an arrangement wherein those holes lead into the associated main suction duct (not shown).

Referring again to FIG. 16, a triangularly shaped area 250 on the inboard upper surface of wing 10 is located rearward of rear spar 30. For a wing having a planform such as that illustrated in FIG. 16, the surface of area 250 would be a suction surface. If a porous skin is used, a construction similar to that illustrated in FIG. 6 would be employed. If suction slots are used as shown in FIG. 16, a skin configuration similar to that illustrated in FIG. 17 would be used. Air drawn through the surfaces of area 250 is passed into spoiler duct 150.

As noted above, an important aim of the invention is to achieve laminar flow control in a way that avoids structural compromise and complexity within the wing box area. This is accomplished through a combination of airfoil shape and suction in the leading and trailing edge regions of the wing such that the airfoil suction distribution and pressure distribution characteristics work effectively and in harmony to maintain laminar flow over a wide range of operating conditions.

To implement this approach, it is necessary to take measures to offset the adverse effects of conditions that disturb the boundary layer. Of principal concern are the distorting effects of crossflow (X-F), TollmienSchlichting (T-S), and shock waves. Since these conditions occur at different regions and in different degrees across the wing, it is necessary to tailor the pressure distribution and suction characteristics in each critical region of the wing. This can be better understood with reference to FIGS. 19 and 20, which illustrate another form of wing according to the invention. The wing illustrated in these FIGURES is similar to the wing 10 discussed above. The principal differences are the omission of a leading edge flap 80, the addition of suction in the nose region of the wing, and different overall contours of the upper and lower surfaces of the wing as defined by the pressure distribution curves of FIG. 21. Like numerals are used to identify the common structural components. For clarity of discussion, details of construction, such as auxiliary spar 74 (see FIG. 5), have been omitted. It will be understood that the wing structure of FIGS. 19 and 20 would include all components as needed to provide suction, ducting, and the like in the manner previously described.

Figure 19:
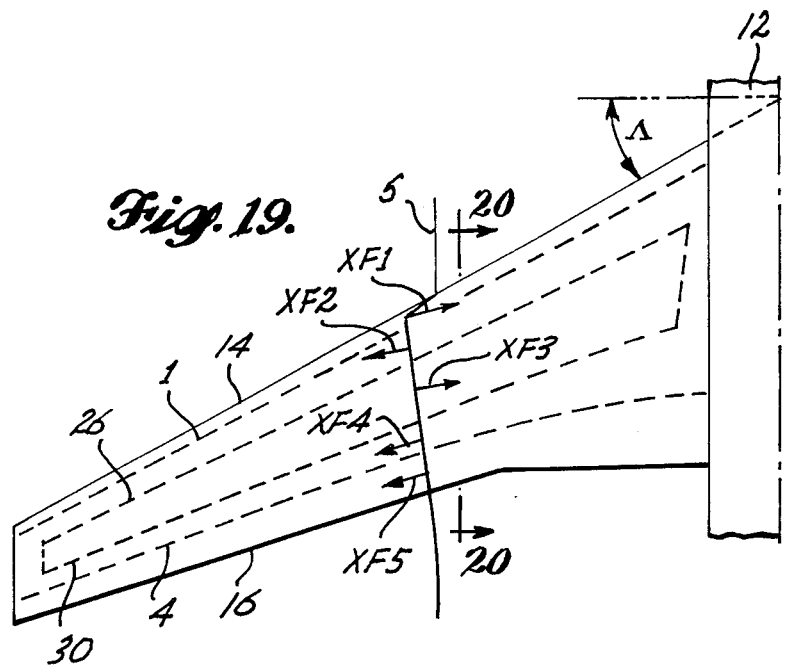
FIG. 19 is a simplified plan view of the upper surface of one form of wing according to the invention, which view graphically depicts the crossflow in each region of the wing.

To provide the proper combination of pressure gradient and suction, it is necessary to accommodate the variations in crossflow found in each chordwise region of the wing. In FIG. 19, the arrows designated XF1 through XF5 emanating from the typical streamline S graphically illustrate the magnitude and direction of the crossflow in a wing having a sweep angle $\Lambda$. In the nose region of the wing, beginning at the edge 14, the sweep of the wing produces crossflow that is directed inboard and that is very high. In the remainder of the leading edge region, between a position 1 of peak pressure and the front spar, the crossflow changes direction and is relatively weak, as shown by the arrow designated XF2. In the main box region between the front spar 26 and the rear spar 30, the crossflow is relatively mild and is directed inboard as shown by the arrow designated XF3. In the region of the shock wave (30-4) aft of the rear spar, strong crossflow is directed outboard as indicated by the arrow designated XF4. Finally, in the region from position 4 to the trailing edge 16, a moderate crossflow is directed outboard as indicated by the arrow XF5.

Figure 21:
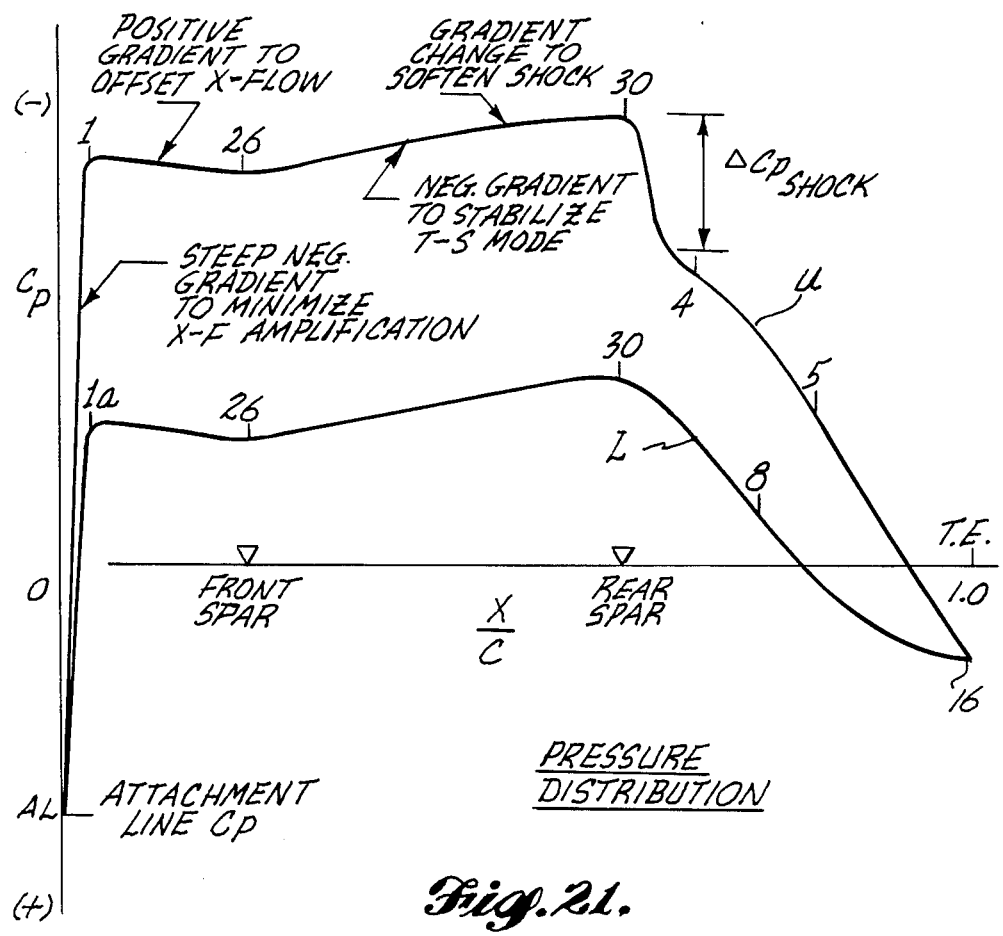
FIG. 21 is a graph that illustrates the pressure distribution characteristics of the wing of FIG. 19.

The various pressure characteristics illustrated in FIG. 21 are selected to offset the unstable crossflow (X-F) and Tollmien-Schlichting (T-S) modes just discussed. In general, either suction or a negative gradient ($dC_p/dx/c$) can be utilized to stabilize the laminar boundary layer. A negative pressure gradient is desirable, since it is simpler to achieve and less costly to apply, particularly in regions where the wing structure must not be compromised. However, on a swept wing any pressure gradient (positive or negative) will produce crossflow that must be stabilized by suction if the X-F mode becomes too large. The graphic presentation of FIG. 21 is similar to that of FIG. 4, showing a plot of the coefficient of pressure $C_p$ as a function of displacement (X) from the leading edge 14 being graduated in terms of decimal percentage (X/C) of chord length C. Curve U in FIG. 4 shows the pressure distribution over the upper surface of the wing, while curve L represents the distribution over the lower surface of the wing.

Starting from the attachment line AL the pressure must fall rapidly in order to make the transition to a level on the upper surface that is needed to develop to wing lift. This produces a very strong X-F, which is partially offset by contouring the surface to make the gradient as steep as possible. The resulting surface curvature also helps to stabilize the X-F. Nose suction is provided in addition to complete the stabilization process and also to offset flow contamination that may result from upstream sources of turbulence. Those skilled in the art will appreciate both the existence and location of the peak pressure position 1 immediately aft of the leading edge 14.

To provide additional offset to the strong crossflow XF1, a slight positive pressure gradient is provided, starting immediately aft of the leading edge peak 1 and continuing to the front spar 26. In addition to offsetting the leading edge crossflow, this positive pressure gradient also provides a residual effect beyond the front spar 26 that helps to offset the crossflow that is generated downstream in the region between the front and rear spars, 26 and 30, respectively. The use of a positive gradient to offset the crossflow mode in th e leading edge region (1–26) tends to destabilize the Tollmien-Schlichting mode, which further increases the T-S amplification normally expected in the main box region (26–30). To stabilize this T-S mode, a negative pressure gradient is provided aft of the front spar 26. This negative gradient also produces a crossflow XF3, which is now directed inboard and of relatively small magnitude. Care must be taken to avoid having the pressure gradient be so large as to produce excessive crossflow amplification. It will be recognized that there is a proper balance that must be achieved, depending upon the Reynolds number and the wing sweep. It will further be appreciated that, at the cruise Mach number, a shock wave will inevitably occur aft of the rear spar 30. To avoid excessive shock losses, the peak pressure at the rear spar on the upper surface must be limited. To soften the shock, it is also preferable to reduce the initial gradient in the region (26–30) by about 50 percent to about 75 percent forward of the rear spar. The point at which this gradient change occurs is aft of the front spar, approximately two-thirds of the distance between the front and rear spars.

From a position 4, which lies behind the shock wave, the pressures recover normally past the trailing edge 5 of the rigid section 140 of the trailing edge spoiler 124 to the wing trailing edge 16. The positioning of the beginning of the recovery must be selected at about the rear spar 30 to avoid separation or excessive boundary layer buildup at the wing trailing edge. It will be observed that the recovery illustrated in FIG. 21 (shock followed by subsonic recovery to a positive value at the trailing edge 16) is typical of conventional high-speed, swept wings.

As shown by curve L, the pressure distribution on the lower surface of the wing substantially mirrors the pressure distribution on the upper surface. A steep negative gradient rises from the attachment line AL to a lower leading edge peak position 1a. The gradient then turns slightly positive over the leading edge region lower surface 42, then changes to a negative gradient at the front spar. Since no shock waves are present on the lower surface, it is not necessary to provide a gradient change across the main box region lower surface 44 between the front and rear spars 26 and 30, respectively. Aft of the rear spar 30, the pressure recovers in a normal, positive manner past the trailing edge 8 of the trailing edge fairing 126 to the trailing edge 16 of the wing.

To complement the airfoil pressure distribution just described, suction is applied in the nose region, leading edge region, and trailing edge region. As used herein, the nose region is that included part of the leading edge region 18 (FIGS. 20 and 23) forward of the nose spar 56. Within the nose region, suction is applied on the upper and lower surface on an inboard area that extends from position 1, through the leading edge 14, to the position 1a. To accomplish this, the nose region structure of FIG. 5 is modified by substituting a porous skin panel (of a construction such as that for skin panel 34) for the nosepiece 54. Suction is applied to this porous nose skin by interconnecting the D-shaped duct that exists forward of the nose spar 56 with the suction air collection system of FIG. 15. The suction so applied stabilizes the attachment line boundary layer and offsets spanwise contamination effects that are associated with wing sweep. As will be discussed in greater detail below in connection with FIG. 22, the nose suction extends only part span to a position I.

As noted earlier, the use of the positive pressure gradient to offset crossflow on the leading edge region upper surface 34 (between the peak position 1 and the front spar 26) destabilizes the Tollmien-Schlichting mode. Suction is applied in the leading edge region to control this T-S mode, to stabilize the crossflow mode, and to thin the boundary layer ahead of the front spar 26. Preferably, the suction is included on both the leading edge region upper surface 34 and the leading edge region lower surface 42. It is generally desirable to also limit the spanwise extent of leading edge suction to a region that lies inboard of a terminating position II (FIG. 22).

It is again to be observed that in the main box region, aft of the forward spar, suction is not provided, so that the only control over conditions that disturb the boundary layer is through the use of properly selected pressure gradients. In the trailing edge region that follows the rear spar 30, suction is applied on the trailing edge spoiler 124 and trailing edge fairing 126 to stabilize Tollmien-Schlichting and crossflow modes and to avoid premature separation of the upper surface. The region covered by the trailing edge spoiler 124 is divided into subregions 30-4 and 4-5. Suction is relatively concentrated in the subregion 30-4 to stabilize the boundary layer flow through the shock wave that will normally appear here in cruise flight. The required suction rate is less in subregion 4-5, but higher than that required on the leading edge region upper surface 34. On the wing lower surface, a lower suction rate is required for the surface of the trailing edge fairing 126 than is required over the trailing edge spoiler 124, since no shock waves are present and since positive pressure gradients are less severe.

Figure 22:
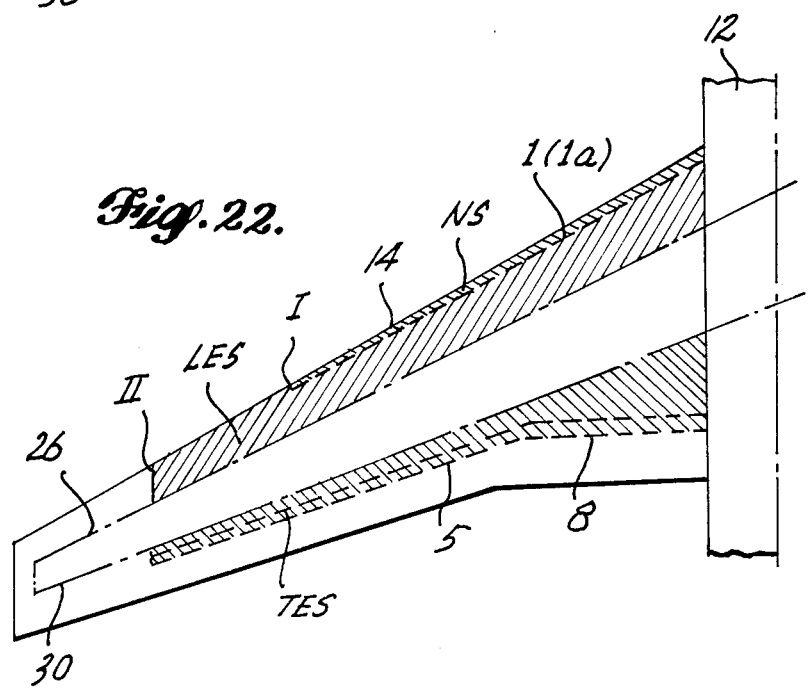
FIG. 22 is a simplified plan view graphically depicting the spanwise suction distribution characteristics of the wing of FIG. 19.

The shaded areas NS, LES, and TES of FIG. 22 illustrate the preferred spanwise areas of the nose region, leading edge region, and trailing edge region, respectively, in which suction is applied. These regions are substantially the same for the upper and lower surfaces. In the unshaded areas, no suction is applied and, accordingly, laminar flow control is achieved through surface contour alone. If desired, of course, suction could be provided the entire spanwise dimension of the wing from root to tip. Since an aim is to complicate the surface of the wing with suction only to the extent necessary, and since the need for suction, particularly on the upper surface, diminishes in the outboard region of the wing, spanwise limitation of the suction is generally preferred. The nose suction is terminated in general at a position I for which the attachment line Reynolds number, $R_{\theta AL}$, becomes less than 100. The definition of the attachment line Reynolds number in terms of wing sweep and airfoil nose shape in accordance with established methods will be readily discernible to those skilled in the art. Suction in the leading edge and trailing edge regions is generally terminated at a position II that is a function of wing sweep. In general, position II corresponds to a spanwise position such that the chord Reynolds number ($R_C$) satisfies the following condition:

$$R_C (\sin \Lambda)^{3/2} \approx 5 \times 10^6 \text{ for } \Lambda \geq 15°; \text{ and}$$

$$R_C \approx 38 \times 10^6 \text{ for } \Lambda < 15°.$$

Consideration of the structure of a high-speed aircraft wing may impose practical constraints that dictate where the trailing edge suction is spanwise terminated. For example, the outboard regions of the upper surface trailing edge of such a wing typically include a control surface such as an aileron. As well, the spoilers typically included do not generally extend to the tip of the wing. In view of this, the suction on the trailing edge will generally terminate either where the control surface (aileron) starts or at the most outboard spoiler.

For the airfoil sections outboard of the termination of the leading and trailing edge suction regions, contour alone is used to promote natural laminar flow. These regions have somewhat different pressure distributions and shapes from the suction airfoils used inboard. In general, the pressure gradients on both upper and lower surfaces are continously negative in the leading edge regions (beginning at points 1 and 1a in FIG. 20) aft to the rear spar 30. These negative gradients are also steeper, usually in the range of about $0.6 < dC_p/dx/c < 0.8$, in order to provide laminar flow to the rear spar.

In the simplified view of FIG. 22, the inboard suction areas are shown extending all of the way inboard to the root chord where the wing joins the fuselage 12. It will be appreciated by skilled aerodynamicists that the typical boundary layer flow characteristics of the wing region adjacent the root chord may make it difficult or undesirable to provide laminar flow control in this area. In designing a wing according to the invention, it is generally an aim to provide the pressure distribution shown in FIG. 21 over as much of the wing as possible through the combined use of surface contour and suction. Practical design constraints may require restricting the laminar flow control to inboard sections of the wing beginning at the positions discussed above and terminating at an inboard position adjacent the root chord.

It should also be pointed out that it may not always be desirable or cost-effective to design for full-chord laminarization of the wing surfaces. In such cases, certain areas may be eliminated from consideration without compromising the benefits due to laminar flow in those areas that remain. For example, the elimination of trailing edge suction would still allow laminar flow to the rear spar, while avoiding the complication associated with suction in an area usually occupied by various mchanical systems, flaps, and controls. The compromises made will, of course, depend upon the particular design requirements and mission of the airplane.

Figure 23:
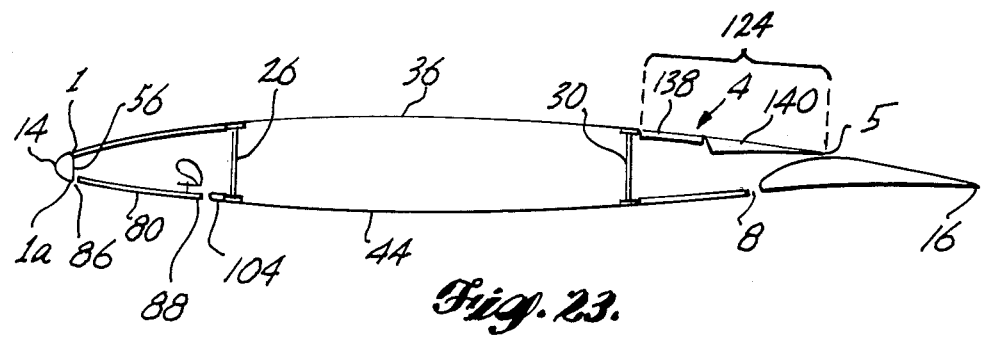
FIG. 23 is a simplified cross-sectional view of a modified form of wing construction that incorporates a leading edge flap.
Figure 24:
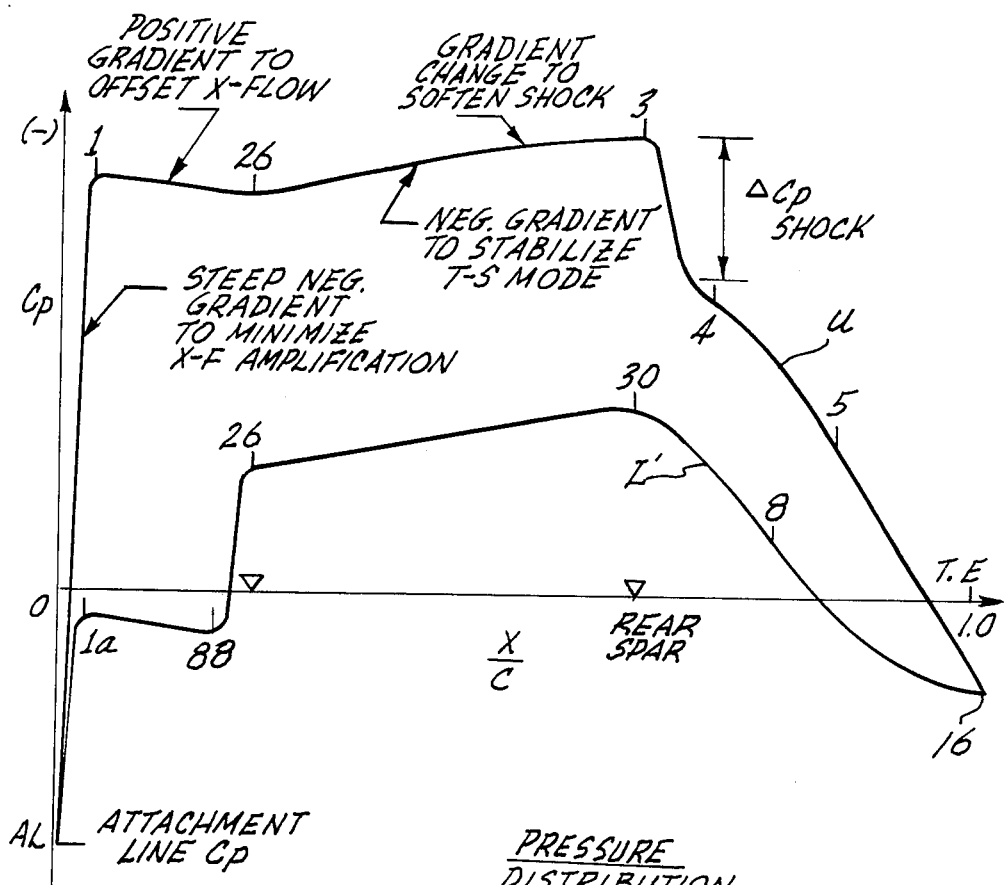
FIG. 24 is a graph that illustrates the pressure distribution characteristics of the wing of FIG. 23.

In situations where it is desirable or necessary to incorporate a leading edge device, such as leading edge flap 80, the airfoil suction and pressure distribution are modified to provide the characteristics illustrated in FIGS. 23 and 24. For the upper surface extending from the leading edge 14 to the trailing edge 16, the characteristics shown by the curve U are essetially the same as the characteristics illustrated in FIG. 21 for the non-leading edge device configuration of FIG. 20. For the lower surface, the presence of the leading edge flap 80 necessitates modification of the suction and pressure distribution characteristics as shown by curve L' in order to maintain laminar flow and obtain the desired lift characteristics. FIGS. 4 and 24 illustrate two different forms of pressure distribution characteristics for a wing having a leading edge device, with the characteristics of FIG. 24 constituting a more definitive specification of the desired form.

Referring to FIGS. 23 and 24, the lower surface of the nose region is contoured to provide a steep negative gradient from the attachment line to a peak position 1a, which is located immediately forward of the suction slot 86 formed between the rear edge of the nosepiece lower portion 54b and the front edge of the leading edge flap 80 (see FIG. 5). This steep negative pressure gradient is required to minimize the intense amplification of the crossflow mode due to sweep. The flap 80 is contoured to provide a slight positive pressure gradient from the peak position 1a to the leading edge aft slot 88. This gradient tends to stabilize the leading edge crossflow mode and provides a residual effect that tends to offset the crossflow that is developed downstream of the leading edge flap 80 in the region between the leading edge aft slot 88 and the front spar 26 and in the main box region beyond the front spar. For the main box region and for the two subregions (30-8 and 8-16) in the trailing edge region, the boundary layer conditions requiring control are the same as for the wing configuration of FIG. 20. Accordingly, the same pressure distribution characteristics between the front spar 26 and the trailing edge 16 as used in the configuration of FIGS. 20 and 21 are used between the front spar and trailing edge in the configuration of FIGS. 23 and 24.

As noted above, the invention aims at striking a harmonious balanced between the use of suction and contour to maintain laminar flow. Since the use of suction necessarily complicates the design of a region and requires power, it is desirable to minimize the suction requirements where possible. Thus, in the configuration of FIG. 23, it is desirable to avoid the necessity of providing suction on the leading edge flap 80 itself. This is accomplished through the provision of suction at the leading edge front and rear slots 86 and 88 and through the use of stepped gradients between the attachment line and the rear spar 26. Nose suction is applied in the nose region between the leading edge and the lower surface peak position 1a to stabilize the crossflow and thin the boundary layer ahead of the leading edge flap 80. Adjacent the peak position 1a, metered suction inflow is induced through the front slot 86 to stabilize the crossflow mode and avoid the disruptive effects on the flow that the slot would otherwise produce. A relatively flat (but slightly positive) gradient is maintained across the leading edge flap and additional suction inflow is induced through the aft slot 88. This suction thins the boundary layer and avoids the disruptive effects on the flow that the aft slot would otherwise produce. In addition, this suction through the aft slot provides favorable conditions for flow onset to the fixed surface behind the flap. In the remainder of the leading edge region between the aft slot 88 and the front spar 26 (i.e., on panel 104 of FIG. 5) suction is provided to stabilize the crossflow mode and to properly condition the boundary layer for the natural laminar flow over the main box region lower surface 44 between the front and rear spars 26 and 30. The suction conditions in the trailing edge region between the rear spar 30 and the tip 8 of the trailing edge fairing 126 are the same as for the wing configuration of FIG. 20.

Figure 20:
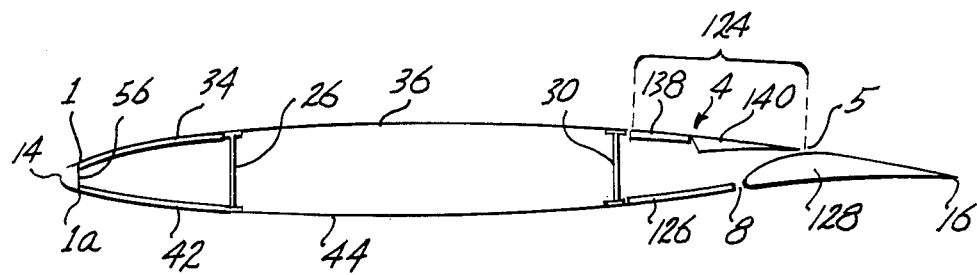
FIG. 20 is a simplified cross-sectional view of the aircraft wing of FIG. 19, taken along section 20—20.

The spanwise suction characteristics of the upper surface of the wing of FIG. 23 would be similar to those for the upper surface of the wing of FIG. 20, as discussed in conjunction with FIG. 22. Thus, the suction in the nose region, the leading edge region, and the trailing edge region can be limited to the inboard sections of the wing, with the outboard sections of the wing being contoured to promote natural laminar flow. In the configuration of FIG. 23, however, the presence of the leading edge flap 80 precludes the maintenance of natural laminar flow on the outboard portions of the lower surface. Consequently, the suction in the nose region and leading edge region of the lower surface for this configuration is not limited to an inboard section, but, rather, extends full-span to the tip of the wing.

Although the illustrations used here apply generally to an airplane wing, the fundamental teachings can be adapted equally well to other wing-like surfaces of an airplane, such as in the empennage, including those areas that incorporate control surfaces.

Having described the invention in its preferred embodiment, it is to be realized that changes the modifications therein may be made without departing from the essential concepts representing the advancements in this art. It is therefore intended that the scope of the claims that follow be limited by their definitional terms and equivalents thereof.

The embodiments of the invention in which an exclusive property or privilege is claimed are defined as follows:

1. A laminar flow control airfoil having an upper surface, a lower surface, a leading edge, a trailing edge, a tip, and a root, said airfoil including front and rear spars that chordwise divide said airfoil into a leading edge region, a main box region, and a trailing edge region, said leading edge region extending between said leading edge and said front spar, said main box region extending aft of said leading edge region between said front and rear spars, said trailing edge region extending aft of said main box region between said rear spar and said trailing edge, said airfoil including suction means internal thereto for applying suction to portions of said leading and trailing edge regions to remove boundary layer air flowing thereover, each of the upper and lower surfaces of said airfoil being contoured to provide a chordwise pressure distribution having a negative gradient rising steeply from a positive pressure value at an attachment line position adjacent the leading edge to a peak negative value at a peak position located immediately aft of said leading edge, a positive gradient from said peak position aft to said front spar, a negative gradient from said front spar aft to said rear spar, and positive recoveries from said rear spar aft to said trailing edge.

2. The airfoil of claim 1, wherein the chordwise pressure distribution on the upper surface of said airfoil between the front and rear spars comprises a first gradient from said front spar aft to a change point and a second gradient from said change point aft to said rear spar, said second gradient being about 50 to 75 percent less than said first gradient.

3. The airfoil of claim 2, wherein said change point is located aft of said front spar about two-thirds of the distance between said front and rear spars.

4. The airfoil of claim 3, wherein said leading edge region has a nose region, said nose region including said leading edge, and wherein said suction means includes:
 leading edge suction means for removing boundary layer air flowing over said leading edge region, said leading edge suction means including nose suction means for removing boundary layer air flowing over said nose region; and
 trailing edge suction means for removing boundary layer air flowing over said trailing edge region.

5. The airfoil of claim 4, wherein each of said leading edge suction means, said nose suction means, and said trailing edge suction means applies suction in an inboard section of its respective region, said inboard section extending spanwise from an initial position adjacent the root of said airfoil to a terminating position spaced inboard of the tip of said airfoil.

6. The airfoil of claim 5, wherein:
 said nose suction means applies suction in an inboard section of said nose region having a terminating position for which the attachment line Reynolds number is approximately 100; and
 said leading edge suction means applies suction in an inboard section of said leading edge region having a terminating position that satisfies the following conditions:
 $R_C(\sin \Lambda)^{3/2} \approx 5 \times 10^6$, for $\Lambda \geq 15°$;
 and $R_C \approx 38 \times 10^6$ for $\Lambda < 15°$;
 where
 $R_C$ = chord Reynolds number; and
 $\Lambda$ = the sweep angle of the leading edge of said airfoil.

7. A laminar flow control airfoil having an upper surface, a lower surface, a leading edge, a trailing edge, a tip, and a root, said airfoil including front and rear spars that chordwise divide said airfoil into a leading edge region, a main box region, and a trailing edge region, said leading edge region extending between said leading edge and said front spar, said main box region extending aft of said leading edge region between said front and rear spars, said trailing edge region extending aft of said main box region between said rear spar and said trailing edge, said airfoil including suction means internal thereto for applying suction to portions of said leading and trailing edge regions to remove boundary layer air flowing thereover, the upper and lower surfaces of said airfoil being contoured to provide a chordwise pressure distribution substantially as shown in FIG. 21, wherein curve U is the pressure distribution over the upper surface of said airfoil, and curve L is the pressure distribution over the lower surface of said airfoil.

8. The airfoil of claim 7, wherein said leading edge region has a nose region, said nose region including said leading edge, and wherein said suction means includes:
 leading edge suction means for removing boundary layer air flowing over said leading edge region, said leading edge suction means including nose suction means for removing boundary layer air flowing over said nose region; and
 trailing edge suction means for removing boundary layer air flowing over said trailing edge region.

9. The airfoil of claim 8, wherein each of said leading edge suction means, said nose suction means, and said trailing edge suction means applies suction in an inboard section of its respective region, said inboard section extending spanwise from an initial position adjacent the root of said airfoil to a terminating position spaced inboard of the tip of said airfoil.

10. The airfoil of claim 9, wherein:
 said nose suction means applies suction in an inboard section of said nose region having a terminating position for which the attachment line Reynolds number is less than approximately 100; and
 said leading edge suction means applies suction in an inboard section of said leading edge region having a terminating position that satisfies the following conditions:

$R_C(\sin \Lambda)^{3/2} \approx 5 \times 10^6$, for $\Lambda \geq 15°$;
 and $R_C \approx 38 \times 10^6$ for $\Lambda < 15°$;
 where
 $R_C$ = chord Reynolds number; and
 $\Lambda$ = the sweep angle of the leading edge of said airfoil.

11. A laminar flow control airfoil having an upper surface, a lower surface, a leading edge, a trailing edge, a tip, and a root, said airfoil including front and rear spars that chordwise divide said airfoil into a leading edge region, a main box region, and a trailing edge region, said leading edge region extending between said leading edge and said front spar, said main box region extending aft of said leading edge region between said front and rear spars, said trailing edge region extending aft of said main box region between said rear spar and said trailing edge, said airfoil including a leading edge flap having a forward edge and an aft edge, said leading edge flap being swingably attached to said leading edge region for movement between a stored position and a deployed position, said leading edge flap forming a portion of the lower surface of said airfoil when said flap is in the stored position, said leading edge region including a forward slot and an aft slot, said forward slot being adjacent said forward edge, said aft slot being adjacent said aft edge, said airfoil including suction means internal thereto for applying suction to portions of said leading and trailing edge regions to remove boundary layer air flowing thereover, said suction means applying suction to said front and rear slots, said upper surface being contoured to provide a chordwise pressure distribution having a negative gradient rising steeply from a positive value at an attachment line position adjacent the leading edge to a peak negative value at a peak position located immediately aft of said leading edge, a positive gradient from said peak position aft to said front spar, a negative gradient from said front spar aft to said rear spar, and positive pressure recoveries from said rear spar aft to said trailing edge; and said lower surface being contoured to provide a chordwise pressure distribution having a negative gradient rising steeply from a positive value at an attachment line position adjacent the leading edge to a peak value at a peak position located immediate aft of said leading edge, said leading edge peak position being located adjacent said forward slot, a positive gradient from said peak position aft to said aft slot, a steep negative gradient from said aft slot to said front spar, a negative gradient from said front spar aft to said rear spar, and positive pressure recoveries from said rear spar aft to said trailing edge.

12. The airfoil of claim 11, wherein the chordwise pressure distribution on the upper surface of said airfoil between the front and rear spars comprises a first gradient from said front spar aft to a change point and a second gradient from said change point aft to said rear spar, said second gradient being about 50 to 75 percent less than said first gradient.

13. The airfoil of claim 12, wherein said change point is located of said front spar about two-thirds of the distance between said front and rear spars.

14. The airfoil of claim 12, wherein said leading edge region has a nose region, said nose region including said leading edge, and wherein said suction means includes:
leading edge suction means for removing boundary layer air flowing over said leading edge region, said leading edge suction means including nose suction means for removing boundary layer air flowing over said nose region; and trailing edge suction means for removing boundary layer air flowing over said trailing edge region.

15. The airfoil of claim 14, wherein each of said leading edge suction means, said nose suction means, and said trailing edge suction means applies suction in an inboard section of its respective region, said inboard section being on the upper surface of said airfoil and extending spanwise from an initial position adjacent the root of said airfoil to a terminating position inboard of the tip of said airfoil.

16. The airfoil of claim 15, wherein:
said nose suction means applies suction in an inboard section of said nose region having a terminating position for which the attachment line Reynolds number is approximately 100; and
said leading edge suction means applies suction in an inboard section of said leading edge region having a terminating position that satisfies the following conditions:

$R_C (\sin \Lambda)^{3/2} \simeq 5 \times 10^6$, for $\Lambda \geq 15°$;

and $R_C \simeq 38 \times 10^6$ for $\Lambda < 15°$;

where
$R_C$ = chord Reynolds number; and
$\Lambda$ = the sweep angle of the leading edge of said airfoil.

17. A laminar flow control airfoil having an upper surface, a lower surface, a leading edge, a trailing edge, a tip, and a root, said airfoil including front and rear spars that chordwise divide said airfoil into a leading edge region, a main box region, and a trailing edge region, said leading edge region extending between said leading edge and said front spar, said main box region extending aft of said leading edge region between said front and rear spars, said trailing edge region extending aft of said main box region between said rear spar and said trailing edge, said airfoil including a leading edge flap having a forward edge and an aft edge, said leading edge flap being swingably attached to said leading edge region for movement between a stored position and a deployed position, said leading edge flap forming a portion of the lower surface of said airfoil when said flap is in the stored position, said leading edge region including a forward slot and an aft slot, said forward slot being adjacent said forward edge, said aft slot being adjacent said aft edge, said airfoil including suction means internal thereto for applying suction to portions of said leading and trailing edge regions to remove boundary layer air flowing thereover, said suction means applying suction to said front and rear slots, the upper and lower surfaces of said airfoil being contoured to provide a chordwise pressure distribution subtantially as shown in FIG. 24, wherein curve U is the pressure distribution over the upper surface of said airfoil, and curve L' is the pressure distribution over the lower surface of said airfoil.

18. The airfoil of claim 17, wherein said leading edge region has a nose region, said nose region including said leading edge, and wherein said suction means includes:
leading edge suction means for removing boundary layer air flowing over said leading edge region, said leading edge suction means including nose suction means for removing boundary layer air flowing over said nose region; and
trailing edge suction means for removing boundary layer air flowing over said trailing edge region.

19. The airfoil of claim 18, wherein each of said leading edge suction means, said nose suction means, and said trailing edge suction means applies suction in an inboard section of its respective region, said inboard section extending spanwise from an initial position adjacent the root of said airfoil to a terminating position spaced inboard of the tip of said airfoil.

20. The airfoil of claim 19, wherein:
said nose suction means applies suction in an inboard section of said nose region having a terminating position for which the attachment line Reynolds number is less than approximately 100; and
said leading edge suction means applies suction in an inboard section of said leading edge region having a terminating position that satisfies the following conditions:

$R_C (\sin \Lambda)^{3/2} \simeq 5 \times 10^6$, for $\Lambda \geq 15°$;

and $R_C \simeq 38 \times 10^6$ for $\Lambda < 15°$;

where
$R_C$ = chord Reynolds number; and
$\Lambda$ = the sweep angle of the leading edge of said airfoil.

* * * * *

UNITED STATES PATENT AND TRADEMARK OFFICE
CERTIFICATE OF CORRECTION

PATENT NO. : 4,813,631

DATED : March 21, 1989

INVENTOR(S) : Louis B. Gratzer

It is certified that error appears in the above-identified patent and that said Letters Patent is hereby corrected as shown below:

Title page, Section [22], "Nov. 2, 1985" should be --Nov. 4, 1989--;

Column 1, line 16, "airflow" (second occurrence) should be --airfoil--;
Column 1, line 39, "maintainence" should be --maintenance--;
Column 4, line 2, "section 3-3" should be --section line --3-3--;
Column 4, line 24, "surface" should be --surfaces--;
Column 7, line 42, "spacers 12" should be --spacers 112--;
Column 11, line 19, "Tollmien Schlichting" should be --Tollmien-Schlichting--;
Column 12, line 35, "th e" should be --the--;
Column 14, line 48, "continously" should be --continuously--;
Column 15, line 57, "balanced" should be --balance--;
Column 16, line 45, "changes the" should be --changes and--;
Column 19, line 7 (Claim 11), "immediate" should be --immediately--.

Signed and Sealed this

Twenty-fourth Day of April, 1990

Attest:

HARRY F. MANBECK, JR.

*Attesting Officer*  *Commissioner of Patents and Trademarks*